(12) United States Patent
Takagi et al.

(10) Patent No.: US 8,308,303 B2
(45) Date of Patent: Nov. 13, 2012

(54) PROJECTOR HAVING COOLING DUCT INCLUDING FLOW PATHS FOR DIRECTING COOLING AIR OVER LIGHT MODULATION DEVICES

(75) Inventors: Kunihiko Takagi, Okaya (JP); Kaname Nagatani, Matsumoto (JP); Akira Egawa, Shiojiri (JP); Tetsuo Shimizu, Matsumoto (JP); Joji Karasawa, Okaya (JP); Fumihide Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 12/844,952

(22) Filed: Jul. 28, 2010

(65) Prior Publication Data

US 2011/0025984 A1 Feb. 3, 2011

(30) Foreign Application Priority Data

Jul. 30, 2009 (JP) ................................. 2009-177434

(51) Int. Cl.
*G03B 21/16* (2006.01)
(52) U.S. Cl. ................ 353/60; 353/30; 353/31; 353/37; 353/52; 353/57; 353/58; 353/119; 362/264; 362/294; 362/373
(58) Field of Classification Search .................... 353/30, 353/31, 33, 37, 52–61, 119; 362/264, 294, 362/373; 349/5–9, 161
See application file for complete search history.

(56) References Cited

U.S. PATENT DOCUMENTS

| | | | |
|---|---|---|---|
| 6,231,191 B1 * | 5/2001 | Shiraishi et al. | 353/61 |
| 6,254,238 B1 * | 7/2001 | Takamatsu | 353/61 |
| 6,736,513 B2 * | 5/2004 | Koyama et al. | 353/31 |
| 6,832,837 B2 * | 12/2004 | Suzuki et al. | 353/61 |
| 6,986,582 B2 | 1/2006 | Kobayashi | |
| 7,073,912 B2 | 7/2006 | Yanagisawa et al. | |
| 7,083,286 B2 * | 8/2006 | Kim et al. | 353/61 |
| 7,148,945 B2 * | 12/2006 | Yanagisawa | 349/161 |
| 7,513,625 B2 * | 4/2009 | Zakoji et al. | 353/54 |
| 2005/0094107 A1 * | 5/2005 | Gishi et al. | 353/57 |
| 2005/0179876 A1 * | 8/2005 | Iinuma et al. | 353/119 |
| 2005/0264766 A1 * | 12/2005 | Morimoto et al. | 353/61 |
| 2006/0209266 A1 * | 9/2006 | Utsunomiya | 353/54 |
| 2008/0252858 A1 * | 10/2008 | Zheng et al. | 353/58 |
| 2011/0019159 A1 | 1/2011 | Egawa et al. | |

FOREIGN PATENT DOCUMENTS

| | | |
|---|---|---|
| CN | 1751266 A | 3/2006 |
| JP | 2001-188305 A | 7/2001 |
| JP | 2001-281613 A | 10/2001 |
| JP | 2004-246108 A | 9/2004 |
| JP | 2009-150975 A | 7/2009 |

\* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

A projector includes: spatial light modulation devices; and a cooling duct configured to flow a cooling air for sequentially cooling the spatial light modulation devices, the cooling duct has a first flow path formed by portions including the light entrance surface of at least one of the spatial light modulation devices for the respective color lights, a second flow path formed by portions including the light exit surface of the corresponding spatial light modulation device, and a junction area where the cooling air flowing through the first flow path and the cooling air flowing through the second flow path join each other, and the junction area is disposed at a downstream position of the cooling air with respect to the spatial light modulation device provided for a predetermined color light whose light amount is the maximum in the respective color lights that enter the light entrance surface.

8 Claims, 5 Drawing Sheets

PROJECTOR HAVING COOLING DUCT INCLUDING FLOW PATHS FOR DIRECTING COOLING AIR OVER LIGHT MODULATION DEVICES

BACKGROUND

1. Technical Field

The present invention relates to a projector, and more particularly to a projector which includes a liquid crystal display panel.

2. Related Art

Currently, a projector having high projection performance and small size is being developed. A typical example of this type of projector including transmission type liquid crystal display panels for red light (R), green light (G), and blue light (B) has been widely used. The liquid crystal display panels included in the projector generate heat when absorbing illumination light. For releasing heat from the liquid crystal display panels, a fan capable of supplying cooling air is employed, for example.

A known cooling structure of a projector supplies cooling air in a direction substantially perpendicular to a plane containing an optical axis along which the liquid crystal display panels are disposed. According this structure, the cooling air can be uniformly supplied to the respective liquid crystal display panels with ease. However, since the fan and a duct through which the cooling air flows are provided above and below the areas where the liquid crystal display panels are disposed, the thickness of the projector is difficult to be reduced. For overcoming this problem, a technology which provides a flow path for guiding the cooling air in a direction substantially parallel with the plane containing the optical axis and sequentially cools the respective liquid crystal display panels and polarization plates has been proposed. For example, JP-A-2001-281613 shows a structure which disposes the liquid crystal display panels around a cross dichroic prism for combining respective color lights, and provides a flow path on each of light entrance surfaces and light exit surfaces of the liquid crystal display panels.

Exit side polarization plates equipped on the light exit surface side of the liquid crystal display panels shield light received from the liquid crystal display panels. In this case, larger amounts of heat are produced from the exit side polarization plates than those from the entrance side polarization plates disposed on the light entrance surface side of the liquid crystal display panels. Thus, cooling air having passed the exit side polarization plates, particularly the G light exit side polarization plate has a higher temperature than the temperature of the cooling air having passed the entrance side polarization plates. The cooling structure proposed in JP-A-2001-281613 has a flow path formed by clearances between the entrance side polarization plates and the liquid crystal display panels and a flow path formed by clearances between the liquid crystal display panels and the exit side polarization plates as separate flow paths. Thus, the cooling air having cooled the G light exit side polarization plate is difficult to sufficiently cool the subsequent exit side polarization plate.

SUMMARY

It is an advantage of some aspects of the invention to provide a projector capable of highly efficiently cooling an exit side polarization plate disposed on the light exit surface side of a liquid crystal display panel by using cooling air.

A projector according to an aspect of the invention includes: spatial light modulation devices each of configured to modulate light received through a light entrance surface of the spatial light modulation device according to an image signal and emits the modulated light through a light exit surface of the spatial light modulation device; and a cooling duct through configured to flow a cooling air for sequentially cooling the spatial light modulation devices provided for each color light flows. The cooling duct includes a first flow path formed by portions including the light entrance surface of at least one of the spatial light modulation devices for the respective color lights, a second flow path formed by portions including the light exit surface of the corresponding spatial light modulation device, and a junction area where the cooling air flowing through the first flow path and the cooling air flowing through the second flow path join each other. The junction area is disposed at a downstream position of the cooling air with respect to the spatial light modulation device provided for a predetermined color light whose light amount is the maximum in the respective color lights that enter the light entrance surface.

The cooling air having passed through the first flow path and the cooling air having passed through the second flow path are mixed in the junction area to equalize the cooling air temperature. Since the temperatures of the cooling air having flowed along an exit side polarization plate and an entrance side polarization plate are equalized, an exit side polarization plate to which the cooling air is supplied next can be sufficiently cooled. Thus, the exit side polarization plates can be highly efficiently cooled by the cooling air.

In a preferred embodiment of the invention, the projector includes a first spatial light modulation device as the spatial light modulation device provided for a first color light corresponding to the predetermined color light and a second spatial light modulation device as the spatial light modulation device provided for a second color light. The second spatial light modulation device is disposed at a downstream position of the cooling air with respect to the first spatial light modulation device in the cooling duct. The junction area is disposed between the first spatial light modulation device and the second spatial light modulation device. According to this structure, the exit side polarization plate for the second color light can be sufficiently cooled.

In a preferred embodiment of the invention, the projector further includes a structure provided in the junction area and formed in such a shape that the width of the junction area changes as the cooling air flows from the first spatial light modulation device to the second spatial light modulation device. According to this structure, the cooling air having passed through the first flow path and the cooling air having passed through the second flow path can be sufficiently mixed in the junction area, and thus the cooling air temperature can be further equalized.

In a preferred embodiment of the invention, the projector further includes a color combining system configured to combine lights supplied from the spatial light modulation devices for the respective colors. The structure has a bulged shape in the junction area such that the cooling air joined in the junction area can be directed toward the color combining system away from the light entrance surface of the second spatial light modulation device. According to this structure, the cooling air can be positively supplied to the exit side polarization plate for the second color light to further sufficiently cool the exit side polarization plate for the second color light.

In a preferred embodiment of the invention, the projector further includes a duct component that composes the cooling duct. The structure is attached to the duct component. According to this structure, the cooling duct having the structure can be easily produced by assembling the duct component to which the structure is attached.

In a preferred embodiment of the invention, the predetermined color light is green light. According to this structure, the exit side polarization plate to which the cooling air having passed through the exit side polarization plate for green light is supplied can be sufficiently cooled.

In a preferred embodiment of the invention, the projector further includes a bulkhead configured to separate the first flow path from the second flow path. The bulkhead is disposed at an upstream position of the cooling air with respect to the spatial light modulation device provided for the predetermined color light. By providing the bulkhead, the pressure loss in the cooling duct can be reduced, and the respective components can be efficiently cooled by a small amount of air. Thus, a fan included in the projector becomes compact and noiseless.

In a preferred embodiment of the invention, the projector further includes: exit side polarization plates disposed for the respective color lights and receiving lights from the light exit surfaces of the spatial light modulation devices; and a partitioning member disposed between the exit side polarization plates and the partitioning member separates the cooling duct into parts on the light entrance surface side and the light exit surface side in the exit side polarization plates. By providing the partitioning member, the cooling air having passed along the light exit surface of the exit side polarization plate to which the cooling air is supplied first can be efficiently supplied to the light exit surfaces of the exit side polarization plates to which the cooling air is supplied second or later. Thus, the exit side polarization plates to which the cooling air is supplied second or later can be sufficiently cooled.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
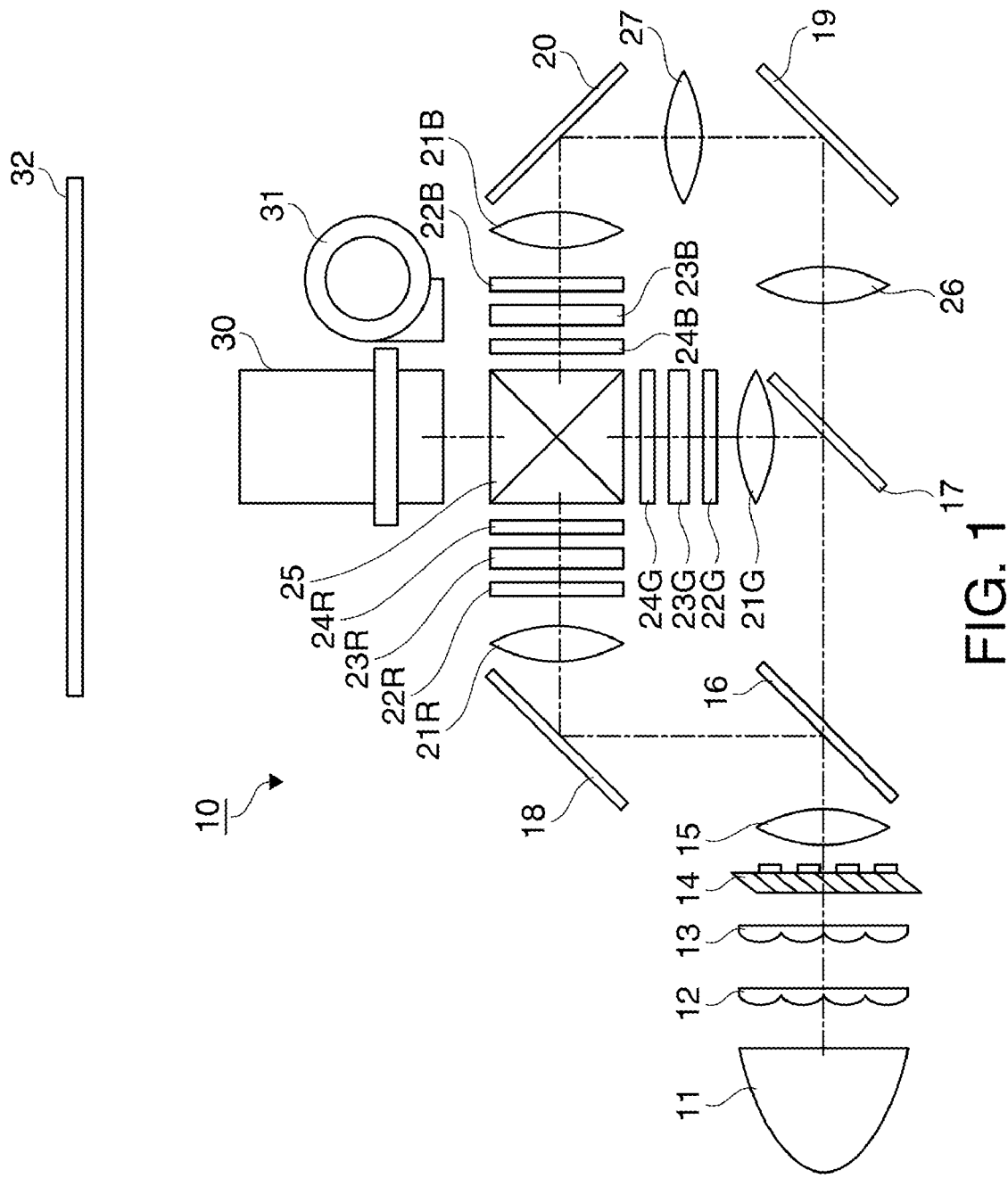
FIG. 1 illustrates the general structure of a projector according to a first embodiment.

Exemplary embodiments according to the invention are hereinafter described in detail with reference to the drawings.
First Embodiment FIG. 1 illustrates the general structure of a projector 10 according to a first embodiment of the invention. The projector 10 is a front projection type projector which projects projection light on a screen 32 such that the light reflected by the screen 32 can be observed as an image. The projector 10 has a cooling duct through which cooling air supplied from a fan 31 flows. The details of the cooling duct will be described later.

A light source unit 11 emits light containing R light, G light, and B light. The light source unit 11 is an extra-high pressure mercury lamp, for example. Each of a first integrator lens 12 and a second integrator lens 13 has a plurality of lens elements disposed in array. The first integrator lens 12 divides the light emitted from the light source unit 11 into plural partial lights. The respective lens elements contained in the first integrator lens 12 converge the light received from the light source unit 11 on the area in the vicinity of the lens elements of the second integrator lens 13. The lens elements of the second integrator lens 13 form images of the lens elements of the first integrator lens 12 on liquid crystal display panels.

A polarization converting element 14 converts the light having passed through the two integrator lenses 12 and 13 into predetermined linear polarized light. A stacking lens 15 stacks the respective images of the lens elements of the first integrator lens 12 on light receiving surfaces of the liquid crystal display panels. The first integrator lens 12, the second integrator lens 13, and the stacking lens 15 equalize the intensity distribution of the light emitted from the light source unit 11 on the light receiving areas of the liquid crystal display panels.

A first dichroic mirror 16 reflects the R light and transmits the G light and B light received from the stacking lens 15. The optical path of the R light received from the stacking lens 15 is bended by the first dichroic mirror 16 and a reflection mirror 18 such that the R light can reach a field lens 21R. The field lens 21R collimates the R light received from the reflection mirror 18 and supplies the R light to an entrance side polarization plate 22R. The entrance side polarization plate 22R transmits predetermined linear polarized light. A liquid crystal display panel 23R is a spatial light modulation device (second spatial light modulation device) which modulates the R light (second color light) received through its light entrance surface according to image signals and emits the modulated R light through its light exit surface. An exit side polarization plate 24R transmits predetermined linear polarized light contained in the light received from the liquid crystal display panel 23R. The entrance side polarization plate 22R and the exit side polarization plate 24R are disposed such that their polarization axes become perpendicular to each other.

A second dichroic mirror 17 reflects the G light and transmits the B light received from the first dichroic mirror 16. The optical path of the G light received from the first dichroic mirror 16 is bended by the second dichroic mirror 17 such that the G light can reach a field lens 21G. The field lens 21G collimates the G light received from the second dichroic mirror 17 and supplies the G light to an entrance side polarization plate 22G. The entrance side polarization plate 22G transmits predetermined linear polarized light. A liquid crystal display panel 23G is a spatial light modulation device (first spatial light modulation device) which modulates the G light (first color light) received through its light entrance surface according to image signals and emits the modulated G light through its light exit surface. An exit side polarization plate 24G transmits predetermined linear polarized light contained in the light received from the liquid crystal display panel 23G.

The B light transmitted by the second dichroic mirror 17 passes through a relay lens 26 and bends its optical path by reflection on a reflection mirror 19. The B light received from the reflection mirror 19 further passes through a relay lens 27 and bends its optical path by reflection on a reflection mirror 20 to enter a field lens 21B. Since the optical path of the B light is longer than the optical paths of the R light and G light, a relay system including the relay lenses 26 and 27 is employed for the optical path of the B light so as to make the illumination magnification on the light receiving area of a liquid crystal display panel 23B equivalent to the magnifications of the liquid crystal display panels for the other color lights.

The field lens 21B collimates the B light received from the reflection mirror 20 and supplies the B light to an entrance side polarization plate 22B. The entrance side polarization plate 22B transmits predetermined linear polarized light. The liquid crystal display panel 23B is a spatial light modulation device (third spatial light modulation device) which modulates the B light (third color light) received through its light entrance surface according to image signals and emits the modulated B light through its light exit surface. An exit side polarization plate 24B transmits predetermined linear polarized light contained in the light received from the liquid crystal display panel 23B. According to this embodiment, the entrance side polarization plate, the liquid crystal display panel, and the exit side polarization plate are provided for each of the R, G, and B lights as the entrance side polarization plates 22R, 22G, and 22B, the liquid crystal display panels 23R, 23G, and 23B, and the exit side polarization plates 24R, 24G, and 24B.

A cross dichroic prism 25 is a color combining system which combines the R light, G light, and B light received from the respective exit side polarization plates 24R, 24G, and 24B and supplies the combined light in a direction toward a projection lens 30. The projection lens 30 projects the light combined by the cross dichroic prism 25 toward the screen 32. The fan 31 supplies cooling air flowing through a cooling duct. The fan 31 may be any types of fan capable of supplying cooling air such as a sirocco fan.

Figure 2:
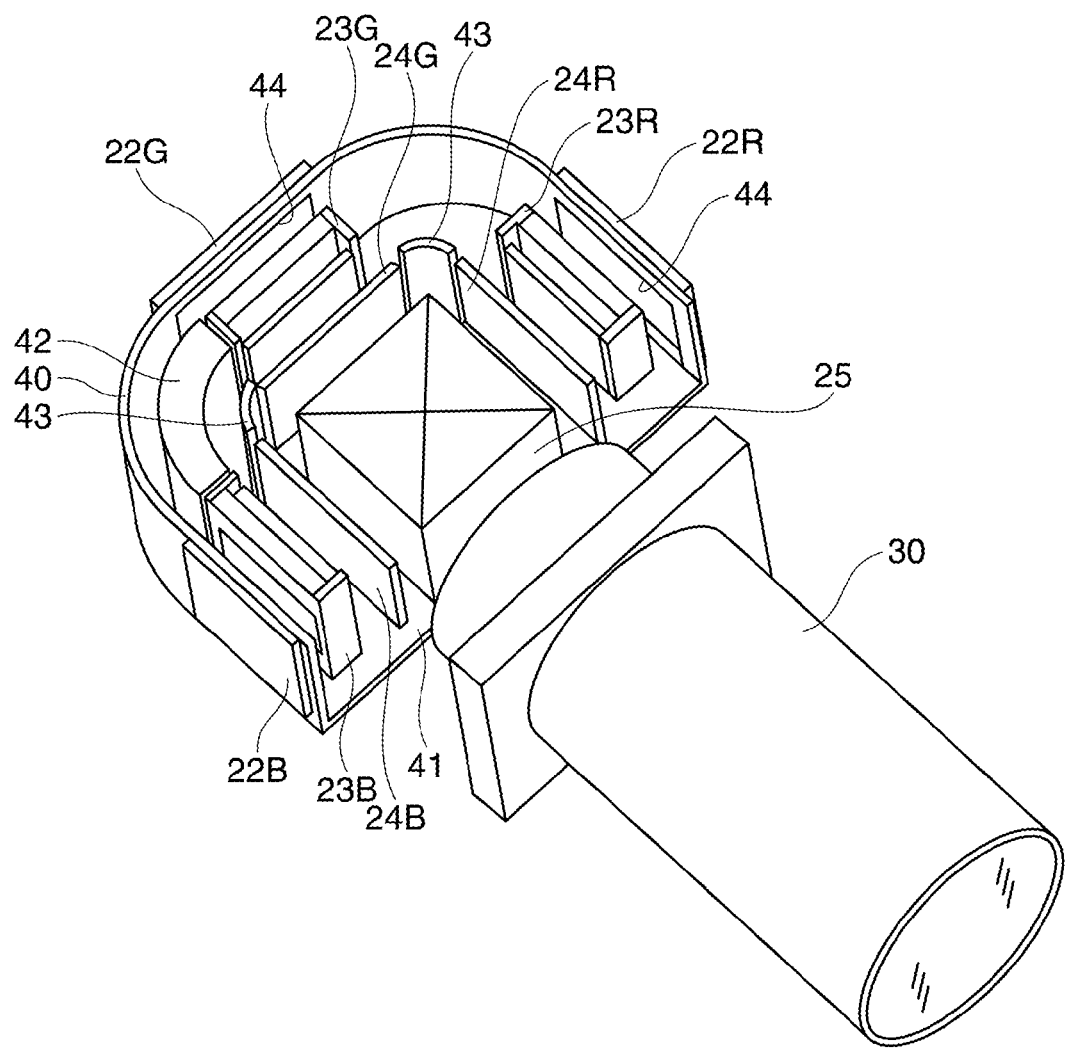
FIG. 2 is a perspective view illustrating a cooling structure and a projection lens after assembled.

FIG. 2 is a perspective view illustrating a cooling structure and the projection lens 30 included in the projector 10 after assembled. The cooling structure has the entrance side polarization plates 22R, 22G, and 22B, the liquid crystal display panels 23R, 23G, and 23B, the exit side polarization plates 24R, 24G, and 24B, the cross dichroic prism 25, and the cooling duct combined as one unit. The entrance side polarization plates 22R, 22G, and 22B, the liquid crystal display panels 23R, 23G, and 23B, the exit side polarization plates 24R, 24G, and 24B, and the cross dichroic prism 25 are mounted on a base 41. The base 41 covers the bottom surface of the cooling duct. A side wall 40 covers the outer circumference of the cooling duct. The upper surface of the cooling structure on the side opposite to the base 41 is covered by a plate-shaped member (not shown) in the area other than the cross dichroic prism 25. This plate-shaped member, the side wall 40, and the base 41 are duct components constituting the cooling duct.

The cooling duct is a flow path through which cooling air for sequentially cooling the liquid crystal display panels 23R, 23G, and 23B, the entrance side polarization plates 22R, 22G, and 22B, and the exit side polarization plates 24R, 24G, and 24B flows. The cooling duct is provided between the side wall 40 and the cross dichroic prism 25. The cooling duct extends in three directions around the cross dichroic prism 25 other than the direction toward the projection lens 30. The cooling duct is bended at two positions between the components associated with B light and the components associated with G light and between the components associated with G light and the components associated with R light. The cooling duct is curved such that the respective light exit surfaces of the liquid crystal display panels 23R, 23G, and 23B are positioned inside with respect to the light entrance surfaces of the liquid crystal display panels 23R, 23G, and 23B positioned outside.

Openings 44 through which light passes are formed on the side wall 40 at positions opposed to the liquid crystal display panels 23R, 23G, and 23B. The entrance side polarization plates 22R, 22G, and 22B are disposed in such positions as to cover the corresponding openings 44 from the outside of the side wall 40. A bulkhead 42 is provided between the B light liquid crystal display panel 23B and the G light liquid crystal display panel 23G. Partitioning members 43 are equipped between the B light exit side polarization plate 24B and the G light exit side polarization plate 24G and between the G light exit side polarization plate 24G and the R light exit side polarization plate 24R. The bulkhead 42 and the partitioning members 43 are disposed at the bended positions of the cooling duct.

Figure 3:
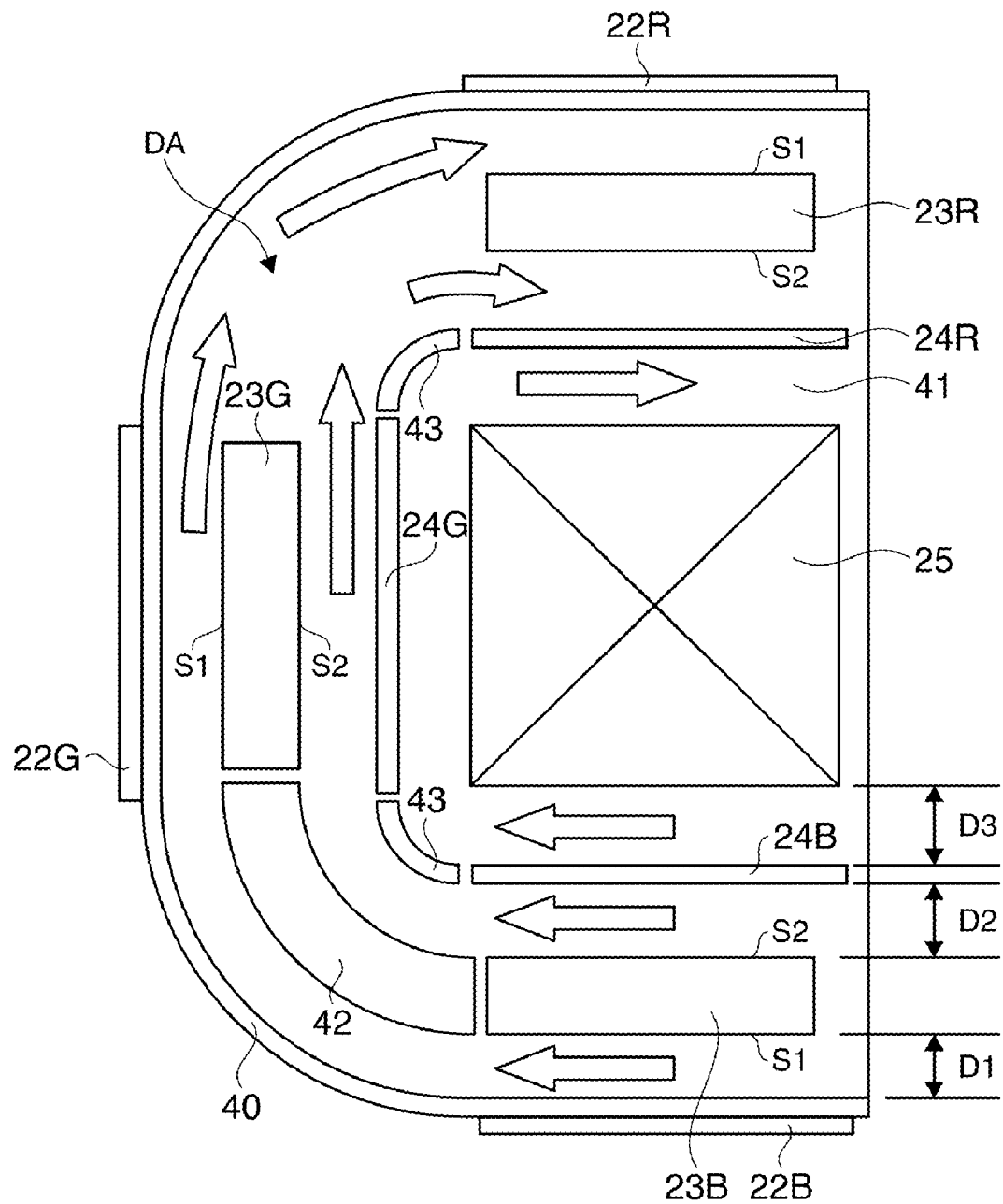
FIG. 3 schematically illustrates the cooling structure shown in FIG. 2 as viewed from above.

FIG. 3 schematically illustrates the cooling structure shown in FIG. 2 as viewed from above. The cooling duct has a first flow path D1, a second flow path D2, a third flow path D3, and a junction area DA. The first flow path D1 is formed by portions including a light entrance surface S1 of the B light liquid crystal display panel 23B, the outer circumferential surface of the bulkhead 42, the light entrance surface S1 of the G light liquid crystal panel 23G, the inner circumferential surface of the side wall 40, the light exit surface of the B light entrance side polarization plate 22B, and the light exit surface of the G light entrance side polarization plate 22G.

The second flow path D2 is formed by portions including a light exit surface S2 of the B light liquid crystal display panel 23B, the inner circumferential surface of the bulkhead 42, the light exit surface S2 of the G light liquid crystal display panel 23G, the light entrance surface of the B light exit side polarization plate 24B, the outer circumferential surfaces of the partitioning members 43, and the light entrance surface of the G light exit side polarization plate 24G. The junction area DA is an area where cooling air flowing through the first flow path D1 and cooling air flowing through the second flow path D2 join each other.

The junction area DA is positioned between the G light liquid crystal display panel 23G and the R light liquid crystal display panel 23R. The R light liquid crystal display panel 23R is located at a downstream position of the cooling air with respect to the G light liquid crystal display panel 23G in the cooling duct. The junction area DA is located at a downstream position of the cooling air with respect to the G light liquid crystal display panel 23G in the cooling duct. In this embodiment, the G light is determined as a predetermined color light whose light amount becomes the maximum in the respective color lights when entering the light entrance surface S1.

The third flow path D3 is formed by portions including the respective light exit surfaces of the exit side polarization plates 24B, 24G, and 24R, the inner circumferential surfaces of the partitioning members 43, and the light entrance surface of the cross dichroic prism 25. The bulkhead 42 is disposed between the B light liquid crystal panel 23B and the G light liquid crystal display panel 23G in the cooling duct. The bulkhead 42 is located at an upstream position of the cooling air with respect to the G light liquid crystal display panel 23G to separate the first flow path D1 from the second flow path D2 in the area between the B light liquid crystal display panel 23B and the G light liquid crystal display panel 23G.

The fan 31 (see FIG. 1) supplies cooling air to the inlet port of the cooling duct. The cooling air supplied from the fan 31 to the first flow path D1 passes between the light exit surface of the B light entrance side polarization plate 22B and the light entrance surface S1 of the liquid crystal display panel 23B. Then, the flowing direction of the cooling air is bended in the area between the outer circumferential surface of the bulkhead 42 and the side wall 40. The cooling air having passed through the area between the bulkhead 42 and the side wall 40 further passes through the area between the light exit surface of the G light entrance side polarization plate 22G and the light entrance surface S1 of the liquid crystal display panel 23G to reach the junction area DA.

The cooling air supplied from the fan 31 to the second flow path D2 passes between the light exit surface S2 of the B light liquid crystal display panel 23B and the light entrance surface of the exit side polarization plate 24B. Then, the flowing direction of the cooling air is bended in the area between the inner circumferential surface of the bulkhead 42 and the outer circumferential surface of the partitioning member 43. The cooling air having passed through the area between the bulkhead 42 and the partitioning member 43 further passes through the area between the light exit surface S2 of the G light liquid crystal display panel 23G and the light exit surface of the exit side polarization plate 24G to reach the junction area DA.

The cooling air flowing through the first flow path D1 and the cooling air flowing through the second flow path D2 join each other in the junction area DA. A part of the cooling air having joined in the junction area DA passes through the area between the light exit surface of the R light entrance side polarization plate 22R and the light entrance surface S1 of the liquid crystal display panel 23R. The other part of the cooling air having joined in the junction area DA passes through the area between the light exit surface S2 of the R light liquid crystal display panel 23R and the light entrance surface of the exit side polarization plate 24R.

The cooling fan supplied from the fan 31 to the third flow path D3 flows along the light entrance surface of the cross dichroic prism 25 and sequentially flows in front of the light exit surface of the B light exit side polarization plate 24B, the inner circumferential surface of the partitioning member 43, the light exit surface of the G light exit side polarization plate 24G, the inner circumferential surface of the partitioning member 43, and the light exit surface of the R light exit side polarization plate 24R.

The cooling air having robbed heat from the B light entrance side polarization plate 22B, the liquid crystal display panel 23B, the G light entrance side polarization plate 22G, and the liquid crystal display panel 23G in the first flow path D1, and the cooling air having robbed heat from the B light liquid crystal display panel 23B, the exit side polarization plate 24B, the G light liquid crystal display panel 23G, and the exit side polarization plate 24G in the second flow path D2 are mixed in the junction area DA. The cooling air mixed in the junction area DA is divided into two parts one of which flows into the flow path between the R light entrance side polarization plate 22R and the light entrance surface S1 of the liquid crystal display panel 23R and the other of which flows into the flow path between the exit surface S2 of the liquid crystal display panel 23R and the exit side polarization plate 24R.

The exit side polarization plates 24R, 24G, and 24B which shield the lights received from the liquid crystal display panels 23R, 23G, and 23B generate larger amounts of heat than those of heat generated from the liquid crystal display panels 23R, 23G, and 23B and the entrance side polarization plates 22R, 22G, and 22B. In addition, the G light having higher visibility than those of the other color lights is required to have higher output. Thus, particularly the cooling air having passed through the G light exit side polarization plate 24G has a higher temperature than that of the cooling air having passed through the entrance side polarization plate 22G. Accordingly, the cooling air having flowed along the second flow path D2 has a higher temperature than that of the cooling air having flowed along the first flow path D1.

According to the projector 10 in this embodiment, the cooling air having passed through the first flow path D1 and the cooling air having passed through the second flow path D2 are mixed in the junction area DA to equalize the cooling air temperature. By this equalization, the temperature of the cooling air supplied to the R light exit side polarization plate 24R becomes lower than the corresponding temperature of the structure which supplies only the cooling air having passed through the second flow path D2 to the R light exit side polarization plate 24R. As a result, the R light exit side polarization plate 24R disposed at the downstream position of the cooling air with respect to the G light exit side polarization plate 24G can be sufficiently cooled.

Thus, deteriorations of the liquid crystal display panels 23R, 23G, and 23B, the entrance side polarization plates 22R, 22G, and 22B, and the exit side polarization plates 24R, 24G, and 24B can be reduced by the efficient cooling of these components using the cooing air. Moreover, since the amount of cooling air required to be supplied decreases by the efficient cooling of the respective components, the operation noise of the fan 31 lowers. Accordingly, the projector 10 becomes noiseless and highly reliable.

According to this embodiment, the third flow path D3 is formed by the surfaces including the partitioning members 43. Thus, the cooling air having passed through the light exit surface of the B light exit side polarization plate 24B can be efficiently supplied toward the light exit surfaces of the G light exit side polarization plate 24G and the R light exit side polarization plate 24R. By this method, the G light exit side polarization plate 24G and the R light exit side polarization plate 24R to which the cooling air is supplied second or later from the fan 31 in the third flow path D3 can be sufficiently cooled. While the partitioning members 43 are provided in this embodiment, removal of the partitioning members 43 is allowed.

The bulkhead 42 and the partitioning members 43 guide the cooling air having passed through the respective components associated with B light toward the respective components associated with G light to reduce pressure loss caused by turbulence of the airflow. By decreasing the pressure loss in the cooling duct, the respective components can be efficiently cooled by using a small amount of air. As a result, the fan 31 becomes compact and noiseless.

When light emitted from the light source unit 11 (see FIG. 1) contains ultraviolet ray, there is a possibility that the ultraviolet ray flows with the B light. By supplying cooling air from the fan 31 to the respective components for B light first in the respective color lights, deterioration of these components by absorption of ultraviolet ray can be effectively reduced. The positions of the sets of components for the respective color lights are not limited to those descried in this embodiment but may be changed as necessary. In addition, the order of the sets of components for the respective color lights for receiving the cooling air from the fan 31 may be changed according to the structure of the projector 10.

Second Embodiment

Figure 4:
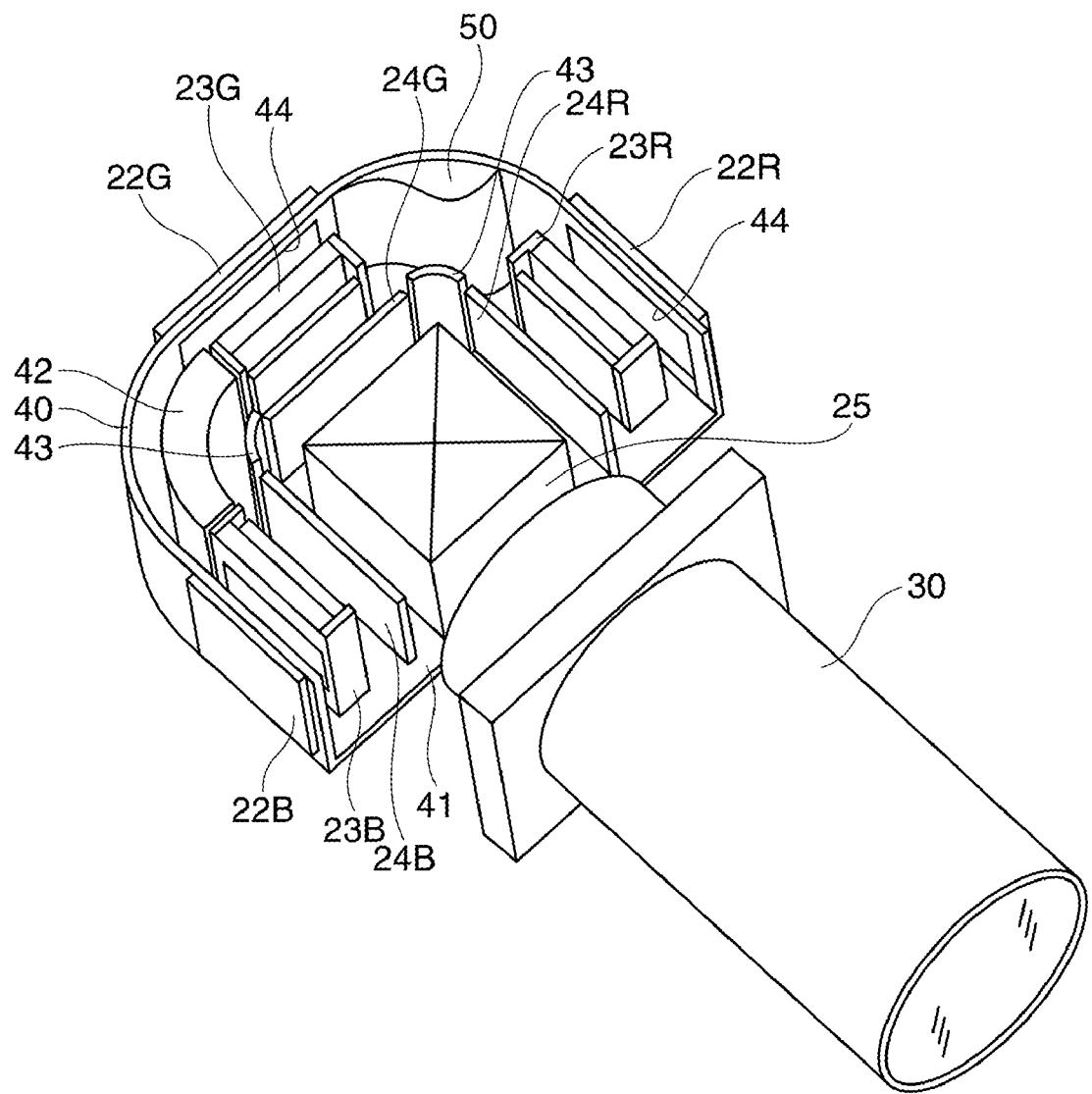
FIG. 4 is a perspective view of a cooling structure and others of a projector according to a second embodiment.
Figure 5:
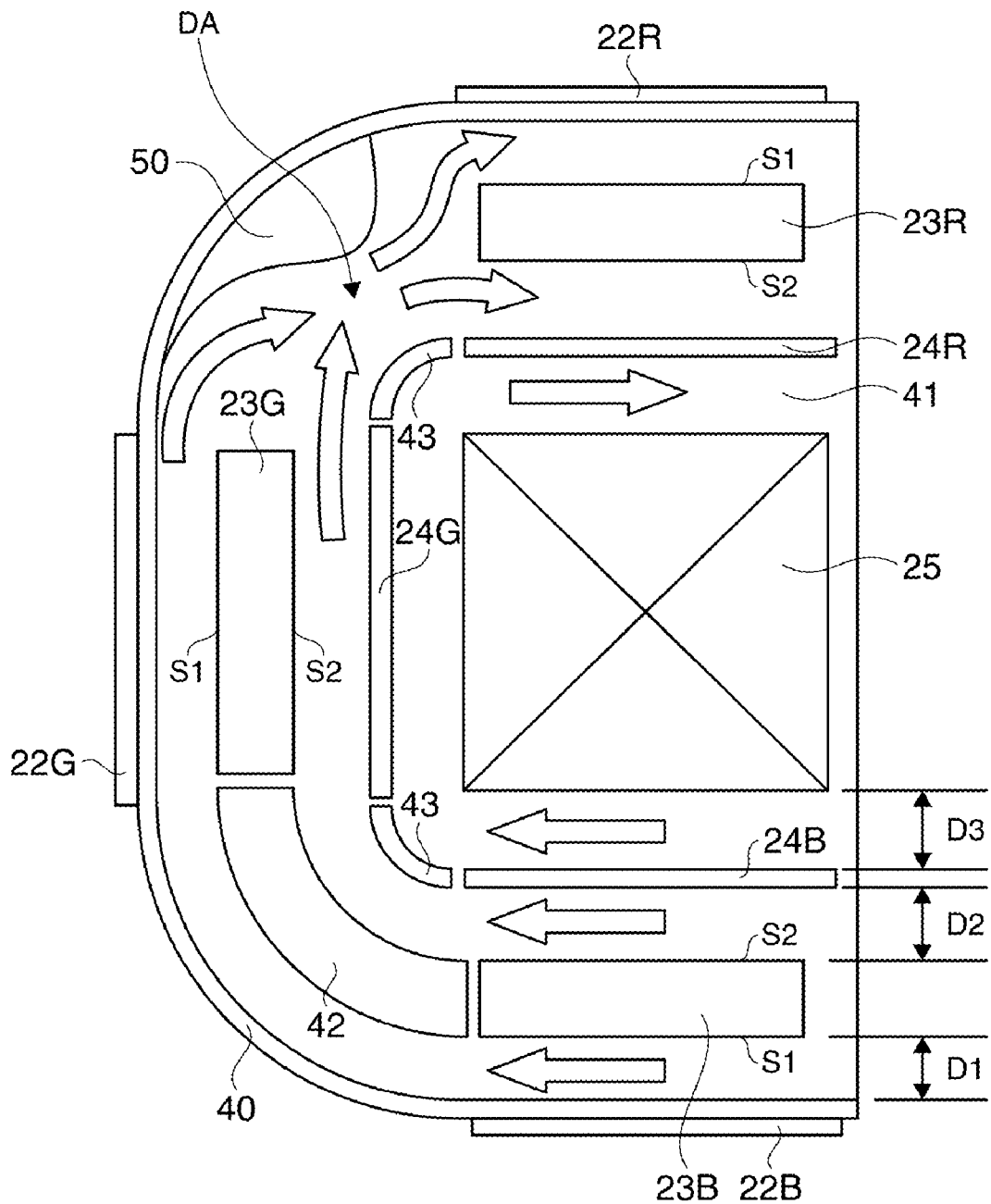
FIG. 5 schematically illustrates the cooling structure shown in FIG. 4 as viewed from above.

FIG. 4 is a perspective view illustrating the assembled structure of a cooling structure and the projector lens 30 in a projector according to a second embodiment of the invention. FIG. 5 schematically illustrates the cooling structure shown in FIG. 4 as viewed from above. This embodiment is characterized by including a structure 50 disposed in the junction area DA of the cooling duct. Similar reference numbers are given to parts similar to those in the first embodiment, and the same explanation is not repeated.

The structure 50 is attached to the inner circumferential surface of the side wall 40 as the duct component at a position within the junction area DA. The surface of the structure 50 opposite to the side wall 40 has a curved surface in a streamline shape in the plane shown in FIG. 5. The structure 50 has a bulged shape in the junction area DA to direct cooling air joined in the junction area DA toward the inside of the curve (toward the cross dichroic prism 25) away from the light entrance surface S1 of the R light liquid crystal display panel 23R.

The width of the junction area DA in the plane shown in FIG. 5 changes in such a manner as to be temporarily narrowed and then expanded as the cooling air flows from the G light liquid crystal display panel 23G to the R light liquid crystal display panel 23R. The cooling duct having the structure 50 can be easily formed by combining the side wall 40 to which the structure 50 is attached and the other duct components.

The cooling air having passed through the first flow path D1 and the cooling air having passed through the second flow path D2 are sufficiently mixed in the junction area DA by the temporarily narrowed flow path formed by the structure 50. By this method, the temperature of the cooling air can be further equalized in the junction area DA. Moreover, since the cooling air having flowed along the structure 50 in the junction area DA changes its flowing direction toward the inside of the curve, the amount of the cooling air toward the light exit surface S2 of the R light liquid crystal display panel 23R becomes larger than the amount of the cooling air toward the light entrance surface S1 of the R light liquid crystal display panel 23R. By positively supplying the cooling air toward the R light exit side polarization plate 24R using the structure 50, the R light exit side polarization plate 24R can be further sufficiently cooled.

The entire disclosure of Japanese Patent Application No. 2009-177434, filed Jul. 30, 2009 is expressly incorporated by reference herein.

What is claimed is:

1. A projector comprising:
   spatial light modulation devices that are each configured to modulate light received through a light entrance surface of the corresponding spatial light modulation device according to an image signal, and each of which emits the modulated light through a light exit surface of the corresponding spatial light modulation device; and
   a cooling duct configured to flow a cooling air for sequentially cooling the spatial light modulation devices provided for each color light such that the cooling air flows over a first spatial light modulation device, and then the cooling air that has flowed over the first spatial light modulation device subsequently flows over a second spatial light modulation device, the cooling duct including:
      a first flow path formed by portions including the light entrance surfaces of the first spatial light modulation device and the second spatial light modulation device for the respective color lights,
      a second flow path formed by portions including the light exit surfaces of the first spatial light modulation device and the second spatial light modulation device, and
      a junction area where a portion of the cooling air flowing through the first flow path and a portion of the cooling air flowing through the second flow path join each other, the junction area being disposed at a downstream position of the cooling air with respect to the first spatial light modulation device provided for a predetermined color light whose light amount is the maximum in the respective color lights that enter the light entrance surface.

2. The projector according to claim 1, wherein
the spatial light modulation device provided for a second color light is the second spatial light modulation device;
the second spatial light modulation device is disposed at a downstream position of the cooling air with respect to the first spatial light modulation device in the cooling duct; and
the junction area is disposed between the first spatial light modulation device and the second spatial light modulation device.

3. The projector according to claim 2, further comprising:
a structure provided in the junction area and formed in such a shape that the width of the junction area changes as the cooling air flows from the first spatial light modulation device to the second spatial light modulation device.

4. The projector according to claim 3, further comprising:
a color combining system configured to combine lights supplied from the spatial light modulation devices for the respective colors, wherein
the structure has a bulged shape in the junction area such that the cooling air joined in the junction area can be directed toward the color combining system away from the light entrance surface of the second spatial light modulation device.

5. The projector according to claim 3, further comprising:
a duct component that composes the cooling duct, wherein
the structure is attached to the duct component.

6. The projector according to claim 1, wherein
the predetermined color light is green light.

7. The projector according to claim 1, further comprising:
a bulkhead configured to separate the first flow path from the second flow path, wherein
the bulkhead is disposed at an upstream position of the cooling air with respect to the first spatial light modulation device provided for the predetermined color light.

8. The projector according to claim 1, further comprising:
exit side polarization plates disposed for the respective color lights and receiving lights from the light exit surfaces of the spatial light modulation devices; and
a partitioning member disposed between the exit side polarization plates and the partitioning member separates the cooling duct into the light entrance surface side and the light exit surface side in the exit side polarization plates.

* * * * *